(12) United States Patent
Choi et al.

(10) Patent No.: US 11,579,811 B2
(45) Date of Patent: Feb. 14, 2023

(54) METHOD AND APPARATUS FOR STORAGE DEVICE LATENCY/BANDWIDTH SELF MONITORING

(71) Applicant: Samsung Electronics Co., Ltd., Suwon-si (KR)

(72) Inventors: Inseok Stephen Choi, Redwood City, CA (US); Yang Seok Ki, Palo Alto, CA (US); Byoung Young Ahn, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/527,143

(22) Filed: Nov. 15, 2021

(65) Prior Publication Data

US 2022/0075566 A1    Mar. 10, 2022

Related U.S. Application Data

(63) Continuation of application No. 16/667,340, filed on Oct. 29, 2019, now Pat. No. 11,194,517, which is a continuation-in-part of application No. 15/225,811, filed on Aug. 1, 2016, now Pat. No. 10,474,374.

(60) Provisional application No. 62/341,059, filed on May 24, 2016.

(51) Int. Cl.
    *G06F 3/06*    (2006.01)
(52) U.S. Cl.
    CPC .......... *G06F 3/0659* (2013.01); *G06F 3/0604* (2013.01); *G06F 3/0679* (2013.01)
(58) Field of Classification Search
    None
    See application file for complete search history.

(56) References Cited

U.S. PATENT DOCUMENTS

| | | | |
|---|---|---|---|
| 6,493,656 | B1 | 12/2002 | Houston et al. |
| 10,545,685 | B2 * | 1/2020 | Tanpairoj ............... G06F 3/061 |
| 2003/0200390 | A1 | 10/2003 | Moore et al. |
| 2004/0117580 | A1 | 6/2004 | Wu et al. |
| 2004/0215883 | A1 | 10/2004 | Bamford et al. |
| 2006/0259686 | A1 | 11/2006 | Sonobe |
| 2009/0070547 | A1 | 3/2009 | Jeong et al. |
| 2009/0238078 | A1 | 9/2009 | Robinson et al. |
| 2011/0066837 | A1 | 3/2011 | Lee et al. |
| 2011/0296052 | A1 | 12/2011 | Guo et al. |
| 2012/0005236 | A1 | 1/2012 | Deng et al. |
| 2012/0188249 | A1 | 7/2012 | Kretz et al. |
| 2012/0254581 | A1 | 10/2012 | Kim |

(Continued)

OTHER PUBLICATIONS

Colgrove, John, et al., "Purity: Building Fast, Highly-Available Enterprise Flash Storage from Commodity Components", Proceedings of the 2015 ACM SIGMOD International Conference on Management of Data, ACM, 2015, 12 pages.

(Continued)

*Primary Examiner* — Tracy C Chan
(74) *Attorney, Agent, or Firm* — Lewis Roca Rothgerber Christie LLP

(57) ABSTRACT

A storage device is described. The storage device may store data in a storage memory, and may have a host interface to manage communications between the storage device and a host machine. The storage device may also include a translation layer to translate addresses between the host machine and the storage memory, and a storage interface to access data from the storage memory. An in-storage monitoring engine may determine characteristics of the storage device, such as latency, bandwidth, and retention.

20 Claims, 12 Drawing Sheets

(56) References Cited

U.S. PATENT DOCUMENTS

| | | | |
|---|---|---|---|
| 2013/0031559 | A1 | 1/2013 | Alicherry |
| 2013/0086303 | A1 | 4/2013 | Ludwig et al. |
| 2013/0227563 | A1 | 8/2013 | McGrath |
| 2013/0297907 | A1* | 11/2013 | Ki .................... G06F 3/0679 711/170 |
| 2014/0089278 | A1 | 3/2014 | Lovinger et al. |
| 2014/0181595 | A1 | 6/2014 | Hoang et al. |
| 2014/0258535 | A1 | 9/2014 | Zhang |
| 2014/0281121 | A1 | 9/2014 | Karamcheti et al. |
| 2015/0134879 | A1 | 5/2015 | Zheng et al. |
| 2015/0178191 | A1 | 6/2015 | Camp et al. |
| 2015/0263899 | A1 | 9/2015 | Fubaltsev et al. |
| 2015/0379420 | A1* | 12/2015 | Basak .................... G06F 16/11 706/12 |
| 2016/0004449 | A1 | 1/2016 | Lakshman et al. |
| 2016/0070480 | A1 | 3/2016 | Babu et al. |
| 2016/0139838 | A1 | 5/2016 | D'Sa et al. |
| 2016/0259586 | A1* | 9/2016 | Tylik .................... G06F 3/0604 |
| 2016/0292025 | A1 | 10/2016 | Gupta et al. |
| 2016/0337202 | A1 | 11/2016 | Ben-Itzhak et al. |
| 2016/0378356 | A1 | 12/2016 | Colgrove et al. |
| 2017/0123852 | A1 | 5/2017 | Chagalakondu et al. |
| 2018/0219743 | A1* | 8/2018 | Garcia .................... H04L 41/12 |

OTHER PUBLICATIONS

Dirik, Cagdas, et al., "The Performance of PC Solid-State Disks (SSDs) as a Function of Bandwidth, Concurrency, Device Architecture, and System Organization," ISCA 2009, Jun. 20-24, 2009, ACM SIGARCH Computer Architecture News. vol. 37. No. 3. ACM, 2009.

Final Office Action for U.S. Appl. No. 15/222,938, dated Feb. 27, 2019.

Final Office Action for U.S. Appl. No. 15/225,811, dated Jul. 10, 2018.

Final Office Action for U.S. Appl. No. 15/227,955, dated Jan. 3, 2019.

Final Office Action for U.S. Appl. No. 15/227,955, dated Jun. 13, 2018.

Meng, Xiaoqiao, et al., "Improving the Scalability of Data Center Networks with Traffic-aware Virtual Machine Placement," INFOCOM, 2010 Proceedings IEEE, 9 pages.

Notice of Allowance for U.S. Appl. No. 15/222,938, dated May 22, 2019.

Notice of Allowance for U.S. Appl. No. 15/225,811, dated Jul. 8, 2019.

Notice of Allowance for U.S. Appl. No. 15/227,955, dated May 16, 2019.

Notice of Allowance for U.S. Appl. No. 16/667,340, dated Aug. 9, 2021.

Office Action for U.S. Appl. No. 15/222,938, dated Jul. 27, 2018.
Office Action for U.S. Appl. No. 15/225,811, dated Dec. 27, 2017.
Office Action for U.S. Appl. No. 15/225,811, dated Jan. 2, 2019.
Office Action for U.S. Appl. No. 15/227,955, dated Dec. 28, 2017.
Office Action for U.S. Appl. No. 15/227,955, dated Sep. 7, 2018.
Office Action for U.S. Appl. No. 16/667,340, dated May 11, 2021.

* cited by examiner

METHOD AND APPARATUS FOR STORAGE DEVICE LATENCY/BANDWIDTH SELF MONITORING

RELATED APPLICATION DATA

This application is a continuation of U.S. patent application Ser. No. 16/667,340, filed Oct. 29, 2019, now allowed, which is a continuation-in-part of U.S. patent application Ser. No. 15/225,811, filed Aug. 1, 2016, now U.S. Pat. No. 10,474,374, issued Nov. 12, 2019, which claims the benefit of U.S. Provisional Patent Application Ser. No. 62/341,059, filed May 24, 2016, all of which are incorporated by reference herein for all purposes.

This application is related to U.S. patent application Ser. No. 15/222,938, filed Jul. 28, 2016, now U.S. Pat. No. 10,439,881, issued Oct. 8, 2019, which claims the benefit of U.S. Provisional Patent Application Ser. No. 62/341,057, filed May 24, 2016, both of which are incorporated by reference herein for all purposes.

This application is related to U.S. patent application Ser. No. 15/227,955, filed Aug. 3, 2016, now U.S. Pat. No. 10,437,486, issued Oct. 8, 2019, which claims the benefit of U.S. Provisional Patent Application Ser. No. 62/341,063, filed May 24, 2016, both of which are incorporated by reference herein for all purposes.

This application is related to U.S. Provisional Patent Application Ser. No. 62/352,509, filed Jun. 20, 2016, which is incorporated by reference herein for all purposes.

FIELD

The inventive concepts relate generally to Solid State Drives (SSDs), and more particularly to determining SSD characteristics from within the SSD.

BACKGROUND

Storage devices, particularly Solid State Drives (SSDs), exhibit continuously-changing characteristics over time. SSDs may have unpredictable latency and/or bandwidth due to the underlying software (i.e., firmware) and/or hardware inside the SSD. For example, NAND flash memory may have a prolonged read/write latency due to read/write errors. Prolonged access latency (read/program/erase) due to cell wearing may also affect latency and/or bandwidth. Virtual abstraction of SSD resources—that is, different approaches such as polymorphic SSDs, open-channel SSDs, and light-NVM (a subsystem that supports open-channel SSDs), to name a few—make it hard to predict an SSD's performance characteristics. Finally, different cell densities—such as Single Level Cell (SLC), Multi-Level Cell (MLC), Three Level Cell (TLC), and Quadruple Level Cell (QLC), to name a few—may have different characteristics.

As such, dynamic latency and bandwidth monitoring/profiling are useful in datacenters to reduce unpredicted latency, which may potentially contribute to long-tail latency. To achieve such enhanced performance is very challenging because measurements are oftentimes complicated. For example, not only does approximating a fitting curve by randomly selecting measurement points require many measurements, but it is very hard to ensure a certain degree of guaranteed performance.

Having said that, the device has the best knowledge of itself. That is, the device's architectural construction supplies many hints on what may contribute to a saturated bandwidth. For example, the number of NAND channels, the number of controllers, the command queue depths, and the number of queues may be hints to estimate the number of requests or duration of measurement to acquire reliable performance data. But devices outside the SSD do not have meaningful access to this information.

A need remains for a way for an SSD to provide profiling information to devices outside the SSD.

DETAILED DESCRIPTION

Figure 1:
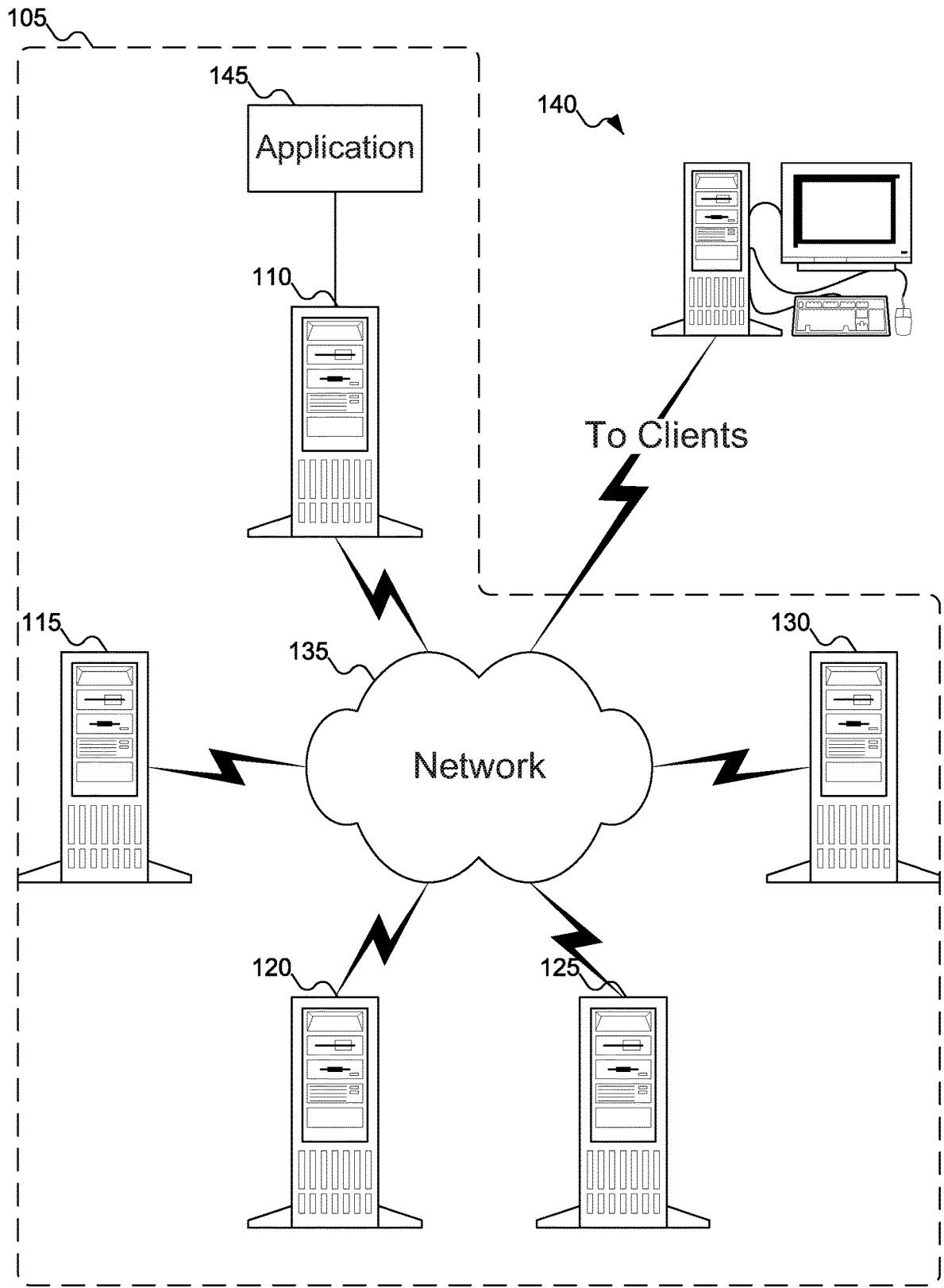
FIG. 1 shows a data center with various host machines, communicating with a client machine.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage device characteristics are more complicated than ever: heterogeneous performances, time-varying performances, and different utilizations of storage devices change access latency/bandwidth, etc. Although there have been many efforts to model such diversities, such models have not been successful. Instead, continuous profiling/monitoring approaches have historically proven to be more reliable and enable performance prediction or long-tail latency analysis and prevention.

There are two fundamental problems with conventional storage device analysis. First, important events or information may be hidden inside storage devices. Second, performance characterization with no prior information makes prediction a real challenge.

Embodiments of the inventive concept may include a new storage device feature: a self-monitoring/profiling engine (referred to herein as an in-storage monitoring engine). The in-storage monitoring engine may generate proper profiling procedures inside the storage device. New vendor commands may be used to send desired information on virtual storage devices implemented in a physical storage device. A host machine may send a single command to profile/monitor device performance. Meanwhile, the storage device may generate profiling vectors based on the command. This approach not only reduces unnecessary data transmissions between the host and storage devices, but also improves efficiency by delivering just results rather than data to measure performance.

Moreover, the storage device may detect changes to its characteristics such as Error Correcting Codes (ECC), read/write retry, Single-Level Cell (SLC)/Multi-Level Cell (MLC) mode changes, etc. The in-storage monitoring engine may compare the new performance data with data in a performance table, which may store information about past performance of the in-storage monitoring engine, and update performance reporting, if necessary.

An in-storage monitoring engine may parse profiling commands and generate profiling vectors. A host machine may send new vendor commands to initiate monitoring/profiling.

Depending on the host's requirements, the in-storage monitoring engine may measure latency/bandwidth at different layers. For example, as discussed below with reference to FIGS. 7A-7B, monitoring may include any Flash Translation Layer (FTL)-caused latencies/bandwidths, or monitoring may bypass the FTL. Bypassing the FTL may eliminate unpredictable performance from storage devices, as monitoring may avoid delays caused by the Address Translation Layer (ATL), Garbage Collection (GC), and Wear Levelling (WL). Such measurement layers may be either explicitly specified in the command or retrieved from a virtual storage table (which contains storage configurations including ATL, GC, WL information).

The implementation of our proposed profiling/monitoring engine is discussed further below with reference to FIG. 8. As shown, a decoder sends a command to the command queue of the engine once it detects a profiling/monitoring command. Because performance characterization may take a relatively long time (from micro-seconds to couple of minutes), there could be multiple pending commands in the queue, and one command may be preempted based on priorities given to each command.

A virtual storage table may store virtual storage IDs (which may distinguish different virtual storage devices on a specific physical storage device). The virtual storage table may be either a copy of the table maintained by the main controller of the physical storage device or shared registers. The performance table may store previous performance-characterization history associated with the virtual storage IDs.

A profiling code register may contain operation vectors to characterize the storage performances. The profiling code register may be self-generated or it may be user programmable. For example, latency characteristics exhibit linear functions associated with the request size (i.e., 4 KB read, 8 KB read, and so on) in most cases. Therefore, performance characterization may be done in different ways. The host or user application may send a query to a device without specifying exact measuring points. In this case, the profiling code register may generate measuring/profiling points. Alternatively, a host machine or application may specify measurement points in the command.

The profiling code register may play an important role in reporting other performance characteristics, such as bandwidth prediction. Unlike latency, which tends to scale linearly with the request size, bandwidth commonly a shows log-like curve with a saturation point. Bandwidth is therefore more complicated to measure than latency. The profiling code register may maintain a small but effective set of measurement points either by a-priori information provided by vendor, or acquired information with the help of machine learning techniques. All such detailed information may be hidden inside the device to make it easy to abstract virtual storage devices with associated performance metrics.

New vendor commands may be provided, to permit a host machine or application to request profile information. Such vendor commands may include a new OP code, inputs such as the operation type and an array of request sizes, and an output.

FIG. 1 shows a data center with various host machines, communicating with a client machine. In FIG. 1, data center 105 is shown as including host machines 110, 115, 120, 125, and 130. More detail about host machines 110, 115, 120, 125, and 130 is shown with reference to FIGS. 2-3 below. Data center 105 may also include network 135 that permits host machines 110, 115, 120, 125, and 130 to communicate with each other and with client machines 140. Network 135 may be any variety of network, including a Local Area Network (LAN) or a Wide Area Network (WAN). Network 135 may use wireline technology—such as Ethernet—wireless technology—such as any of the IEEE 802.11 a/b/g/n/ac or equivalent or replacement technologies—or a combination of the two. In addition, while FIG. 1 suggests that host machines 110, 115, 120, 125, and 130 are located within a single geographic area, in other embodiments of the inventive concept host machines 110, 115, 120, 125, and 130 may be geographically dispersed and interconnected using a global network, such as the Internet (possibly using an overlay network, such as a Virtual Private Network (VPN)).

While FIG. 1 shows host machines 110, 115, 120, 125, and 130 as identical and all as tower computers, embodiments of the inventive concept may support any desired formats for host machines 110, 115, 120, 125, and 130, which may all be different. For example, some host machines 110, 115, 120, 125, and 130 might be tower computers of various models and manufacture, and other host machines 110, 115, 120, 125, and 130 might be rack-mounted server of various models and manufacture. Different host machines 110, 115, 120, 125, and 130 may have different capabilities, in terms of processor capability, available memory, and available storage, all of which may be of varying formats. For example, some host machines 110, 115, 120, 125, and 130 might use Dynamic Random Access Memory (DRAM) for member, while others might use Persistent Random Access Memory (PRAM), Static Random Access Memory (SRAM), Ferroelectric Random Access Memory (FRAM), or Non-Volatile Random Access Memory (NVRAM), such as Magnetoresistive Random Access Memory (MRAM). Similarly, some host machines 110, 115, 120, 125, and 130 might use conventional hard disk drives for storage, while others might use flash memory (a variety of NVRAM) or MRAM. Other possibilities, whether or not enumerated here, are also within the scope of the inventive concept.

As noted above, host machines 110, 115, 120, 125, and 130 are all essentially equivalent and interchangeable. Accordingly, any reference to host machine 110 in the remainder of this document is intended to encompass any and all of host machines 110, 115, 120, 125, and 130, without limitation.

While FIG. 1 shows client machines 140 as a conventional minitower computer system, with monitor, keyboard, and mouse, client machines 140 may take any desired form, including laptop computers, tablet computers, smartphones, and any other desired technological format. In addition, while FIG. 1 shows a single client machine 140, embodiments of the inventive concept may support any number of client machines 140 simultaneously.

Figure 2:
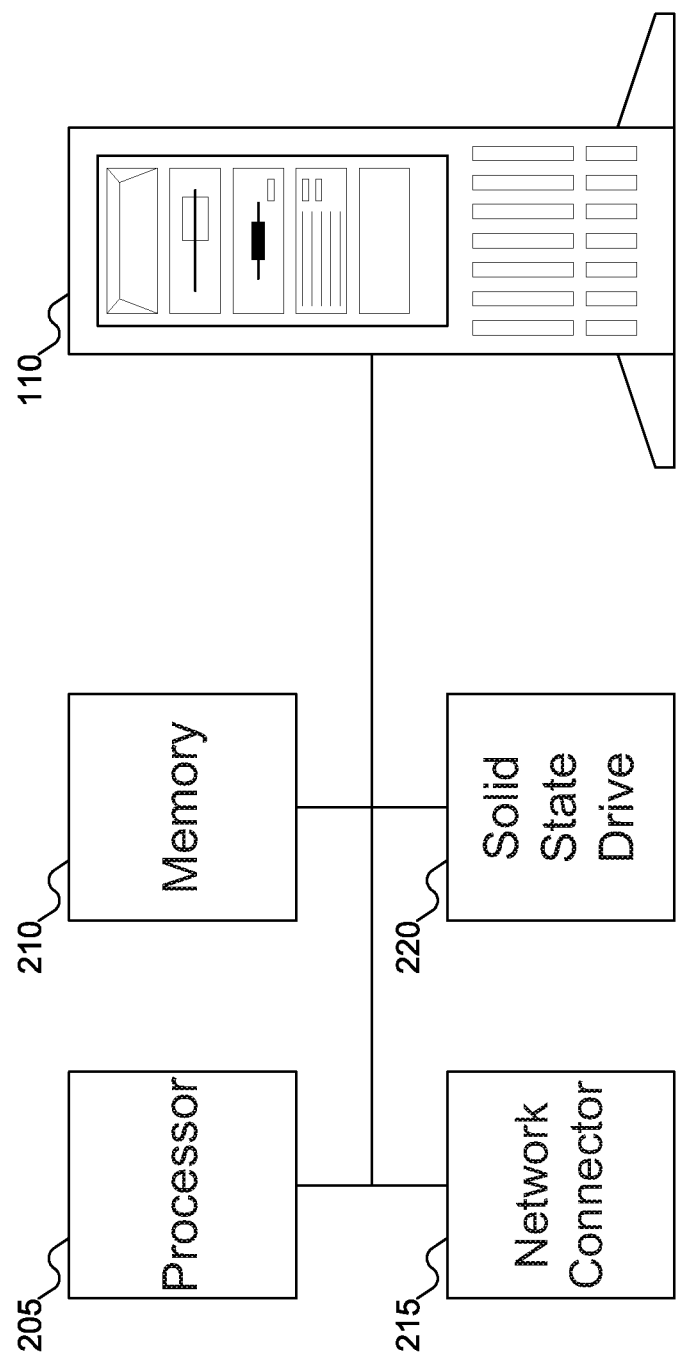
FIG. 2 shows details of a host machine of FIG. 1, according to an embodiment of the inventive concept.

FIG. 2 shows details of host machine 110 of FIG. 1, according to an embodiment of the inventive concept. In FIG. 2, host machine 110 is shown as including processor 205 (also referred to as a Central Processing Unit (CPU)), memory 210, network connector 215, and Solid State Drive (SSD) 220. Processor 205 may be any variety of processor: for example, an Intel Xeon, Celeron, Itanium, or Atom processor, an AMD Opteron processor, an ARM processor, etc. As described above, memory 210 may be any variety of memory, such as flash memory, SRAM, PRAM, etc. but is typically DRAM. Network connector 215 may be any variety of connector that may connect host machine 110 to network 135 of FIG. 1: for example, an Ethernet interface or a wireless interface. SSD 220 may be any variety of SSD adapted to operate as described in the inventive concept. While host machine 110 is shown as including SSD 220, embodiments of the inventive concept may support the use of any storage device for which latency, bandwidth, and other operational characteristics generally have a static definition.

Figure 3:
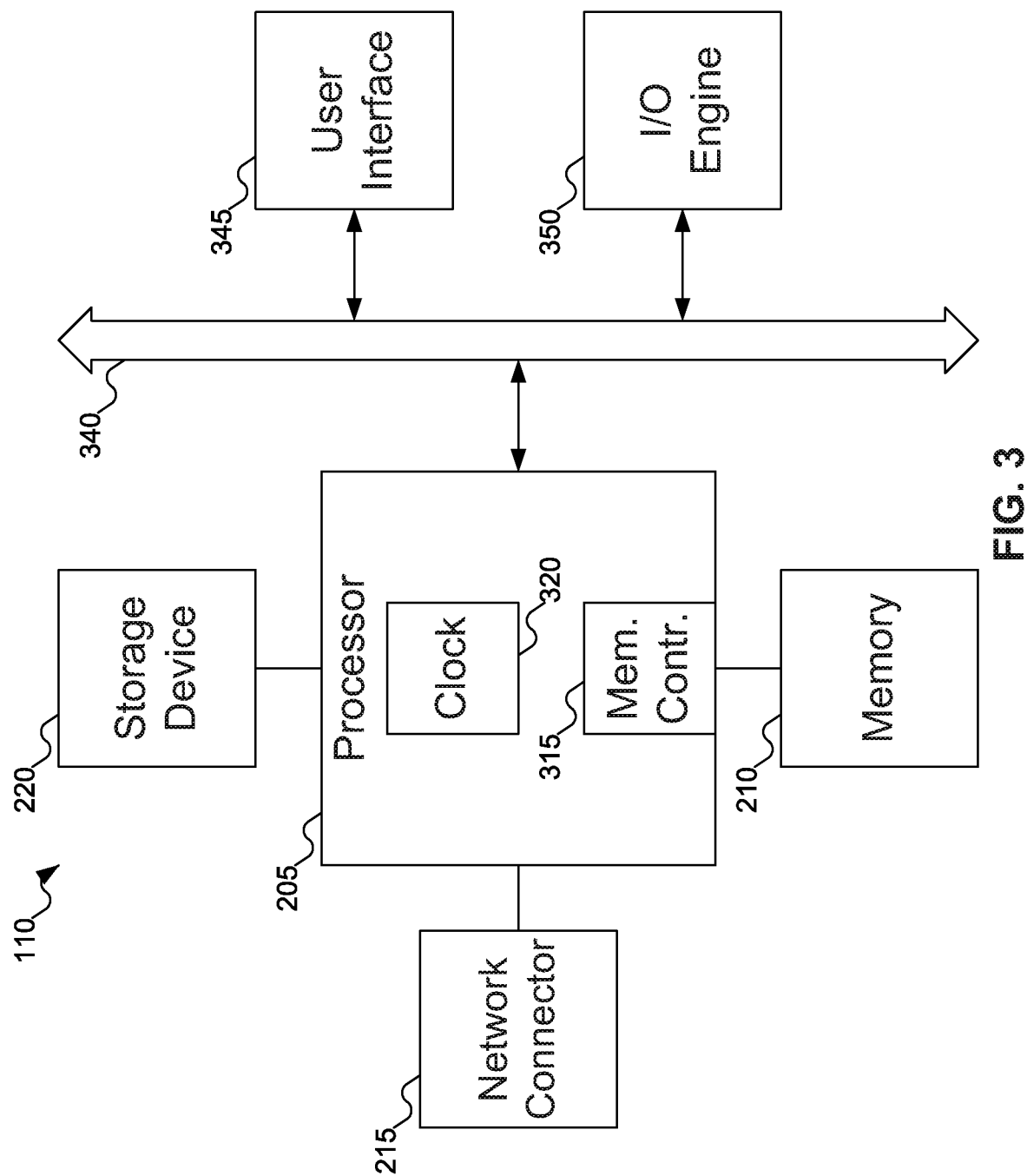
FIG. 3 shows additional details of the host machine of FIG. 1.

FIG. 3 shows additional details of host machine 110 of FIG. 1. Referring to FIG. 3, typically, machine or machines 110 include one or more processors 205, which may include memory controller 305 and clock 310, which may be used to coordinate the operations of the components of machine or machines 110. Processors 205 may also be coupled to memory 210, which may include random access memory (RAM), read-only memory (ROM), or other state preserving media, as examples. Processors 205 may also be coupled to storage devices 220, and to network connector 315, which may be, for example, an Ethernet connector or a wireless connector. Processors 205 may also be connected to a bus 320, to which may be attached user interface 325 and input/output interface ports that may be managed using input/output engine 330, among other components.

Figure 4:
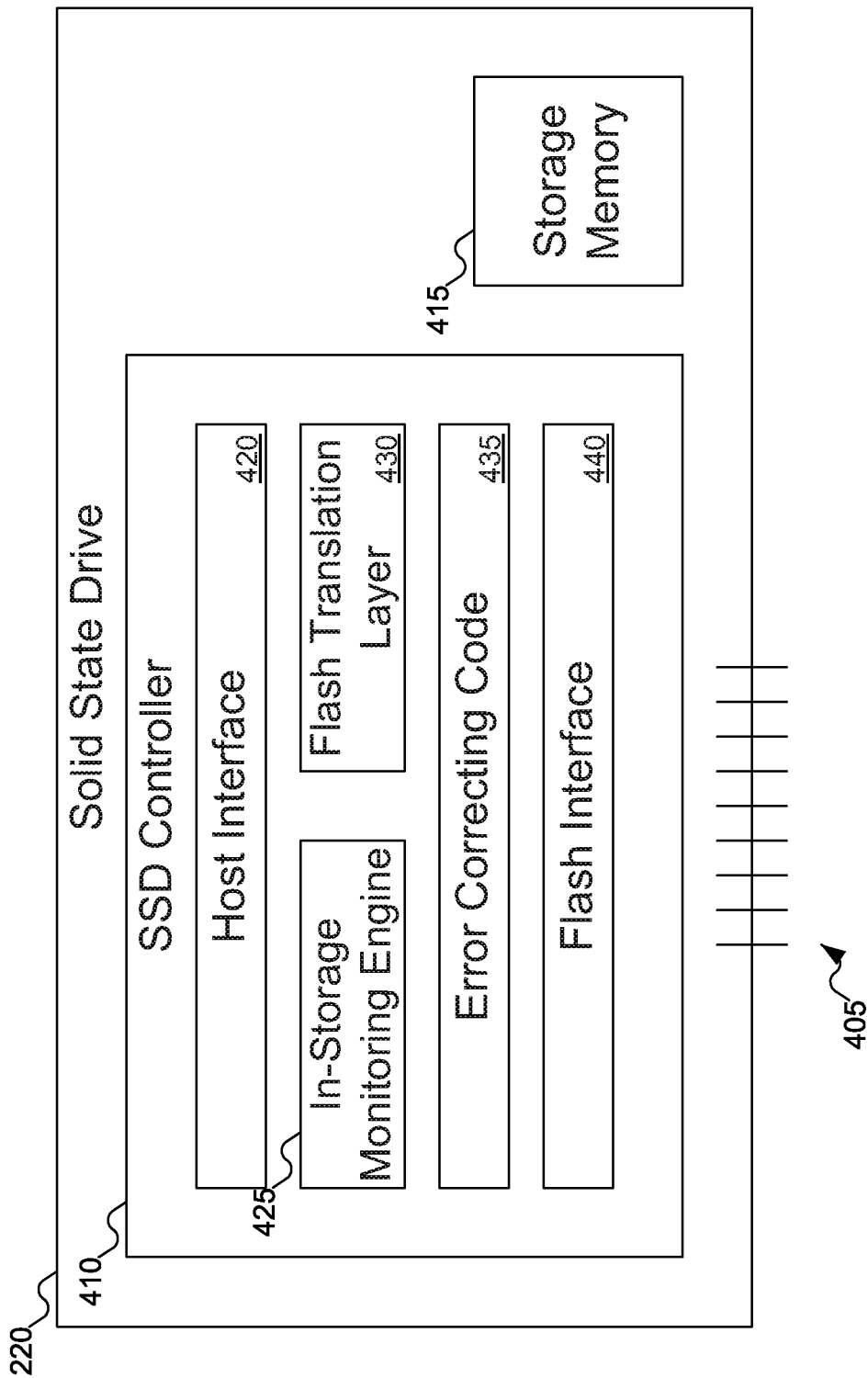
FIG. 4 shows details of the Solid State Drive (SSD) of FIG. 2, according to one embodiment of the inventive concept.

FIG. 4 shows details of SSD 220 of FIG. 2, according to one embodiment of the inventive concept. In FIG. 4, SSD 220 may include circuitry 405 that may be used to send and receive information (such as operations or data) to host machine 110. SSD 220 may also include SSD controller 410 and storage memory 415, which may be flash memory. SSD controller 410 may control the operation of SSD 220. Storage memory 415 may store data used by various computers, including host machines 110 and client machines 140 of FIG. 1.

SSD controller 410 may include, among other components, host interface 420, in-storage monitoring engine 425, Flash Translation Layer (FTL) 430, Error Correcting Code (ECC) 435, and flash interface 440. Host interface 420 may manage communications between SSD 220 and host machine 110 of FIG. 1. In-storage monitoring engine 425, described further below with reference to FIGS. 6-8, may perform the monitoring of SSD 220 to profile the characteristics of SSD 220. FTL 430 may perform translation between logical block addresses (LBAs) (as used by host machine 110 of FIG. 1) and physical block addresses (PBAs) within flash memory 415. ECC 435 may use error correcting codes to provide protection against data corruption and/or errors due to wear on the storage memory 415. Flash interface 440 may manage accessing (reading and writing) data from flash memory 415.

Figure 5:
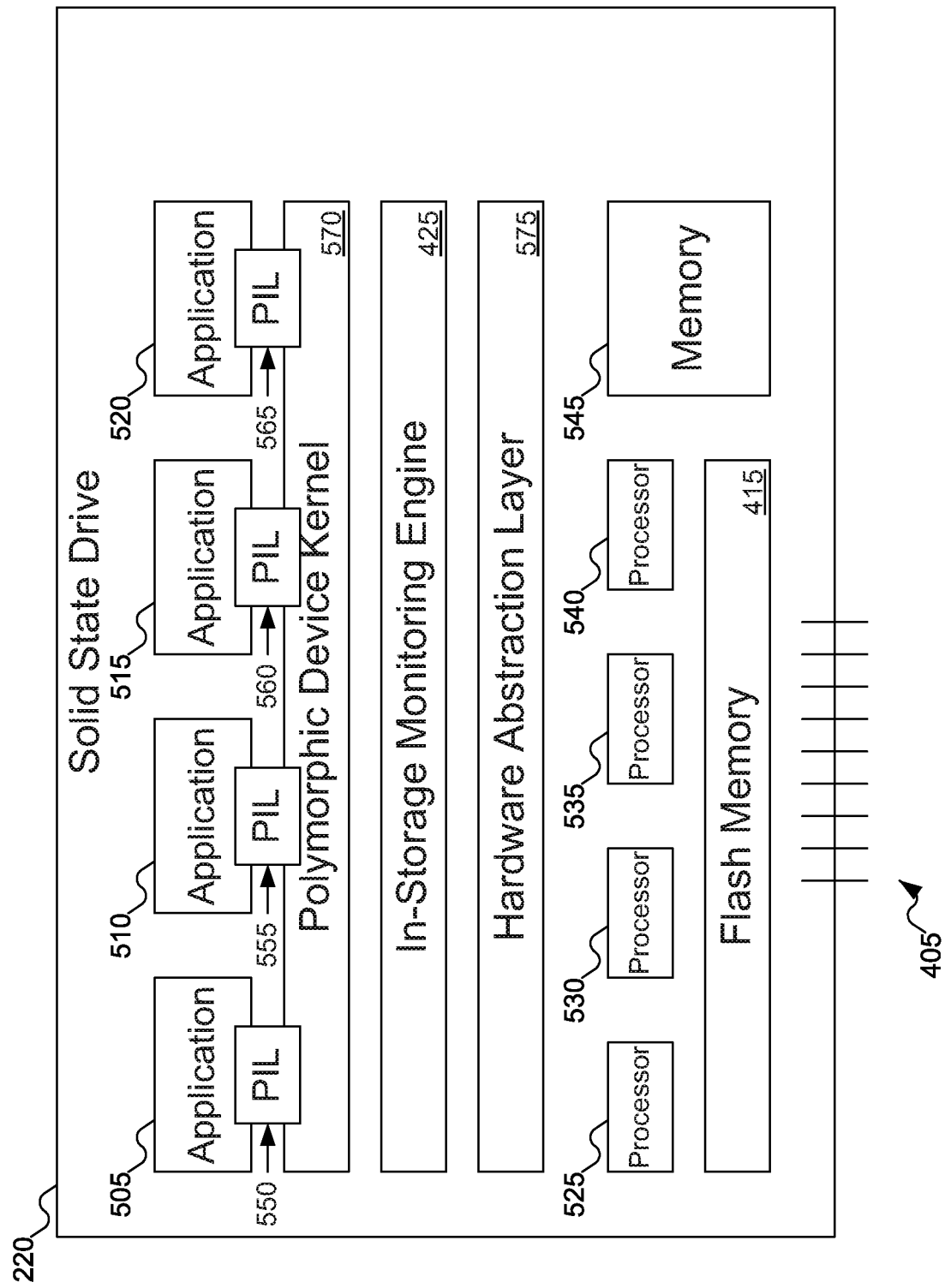
FIG. 5 shows details of the SSD of FIG. 2, according to another embodiment of the inventive concept.

In FIG. 4, SSD 220 may represent an SSD using a single interface. That is, however SSD 220 operates, it operates the same for all applications. For example, SSD 220 might provide a conventional file store, or an object store, or a key-value store: but whichever it is, SSD 220 in FIG. 4 is limited to that one interface. (This is not to say that SSD 220 may not hold multiple virtual storage devices, but all virtual storage devices within SSD 220 as shown in FIG. 4 use the same interface.) But in other embodiments of the inventive concept, SSD 220 may support multiple different interfaces. In such an embodiment of the inventive concept, SSD 220 may be a polymorphic SSD. FIG. 5 shows details of SSD 220 of FIG. 2, according to such an embodiment of the inventive concept.

In embodiments of the inventive concept where SSD 220 is replaced with another storage device technology—for example, a hard disk drive—instead of using flash memory, storage memory 415 may use another technology, such as magnetic bits stored on a disk. Corresponding changes may be made in other parts of the storage device. For example, FTL 430 may be replaced with a translation layer 430 that has similar functionality to FTL 430 but might be implemented differently, and flash interface 440 may be replaced with some other storage interface 440 to access data from storage memory 415. But in the remainder of this document, in the context of using SSD 220 as a storage device, storage memory 415 will be referred to as flash memory 415.

In FIG. 5, SSD 220 is shown as a polymorphic SSD. Polymorphic SSDs are described further in U.S. patent application Ser. No. 15/133,085, filed Apr. 19, 2016, which claims priority from U.S. Provisional Patent Application Ser. No. 62/238,659, filed Oct. 7, 2015, and from U.S. Provisional Patent Application Ser. No. 62/352,509, filed Jun. 20, 2016, all of which are incorporated by reference herein. SSD 220 still includes circuitry 405 to send and receive information (such as operations or data) to host machine 110. SSD 220 may also include SSD controller 410 of FIG. 4 (not shown in FIG. 5), which may include some or all of the components shown in FIG. 5.

SSD 220 may include applications 505, 510, 515, and 520. These applications may be running on processors 525, 530, 535, and 540 within SSD 220 (which may be referred to as In-Storage Computing). Memory 545 may support processors 525-540. Memory 545 may be any desired form of memory, as discussed above, but commonly is DRAM. While FIG. 5 shows SSD 220 as including four processors 525-540 and four applications 505-520, embodiments of the inventive concept may support any number of processors and any number of applications, and there may be different numbers of processors and applications. For example, SSD 220 might include eight processors running 16 applications.

Each application 505-520 may operate using a different interface. For example, application 505 might use a conventional file store, while application 510 might use an object store, and application 515 might use a key-value store. To support these different interfaces, SSD 220 may include a different Polymorphic Interface Layer (PIL) 550, 555, 560, and 565 for each application. PILs 550-565 provide an interface between the applications, using whatever interface the applications desire, and polymorphic device kernel 570. Polymorphic device kernel 570 may then issue instructions to processors 525-540 appropriate to applications 505-520, depending on the specific interface used by applications 505-520, or to flash memory 415, depending on the instruction in question.

While FIG. 5 shows applications 505-520 running on processors 525-540 on SSD 220, in other embodiments of the inventive concept applications 505-520 may run on processors, such as processor 205 of FIG. 2, within host machines 110 of FIG. 1. Applications 505-520 simply need to communicate with the appropriate PIL 550-565 within SSD 220 (assuming that translation from the various interfaces does not occur on host machine 110 of FIG. 1).

Because each different interface may access data within SSD 220 in different ways, hardware abstraction layer 575 may abstract away how the physical hardware may implement the different interfaces. For example, compare and contrast a conventional file store with a key-value store. When applications use a conventional file store, they may issue block read and write instructions. For such a conventional file store operation, hardware abstraction layer 575 may act much like FTL 430 of FIG. 4, translating LBAs within applications 505-520 into PBAs for flash memory 415. But applications using key-value stores issue get and put commands, associated with keys. The keys themselves are not LBAs, but rather a unique identifier associated with the corresponding value. The object storing the key-value pair may reside anywhere in flash memory 415. For applications using a key-value store, hardware abstraction layer 575 may translate the key into a PBA for flash memory 415.

A question might arise why characteristics of an SSD might change. For example, wouldn't the latency or bandwidth of the SSD be constant in all circumstances? The answer is no, for two reasons. One reason is the operation of applications in In-Storage Computing; the other the use of polymorphic SSDs, such as SSD 220 of FIG. 5.

When SSD 220 operates strictly as a storage device using a single interface, one may expect that the characteristics of SSD 220 would not change. But when applications run in In-Storage Computing, even if all the applications use the same interface to SSD 220, part of the computing power of SSD 220 is directed toward managing the applications. With SSD 220 "distracted" by managing the applications, SSD 220 might spend less time processing data requests. With fewer data requests being processed in a given interval, the amount of time needed to process data requests may increase, resulting in an increased latency. Similarly, bandwidth may be reduced when SSD 220 "distracted" by managing applications.

When SSD 220 is a polymorphic SSD, things may become even more complicated. The time required to translate from the application's native language into commands to read data from and/or write data to flash memory 415 may vary, affecting the latency and bandwidth for SSD 220. In other words, the time required to translate a data request into a command that may be processed by SSD 220 may vary depending on the number of applications running and what interfaces they use, resulting in characteristics that may change over time during the operation of SSD 220. Embodiments of the invention provide a technical solution to the problem of determining the current characteristics of SSD 220, and doing so more accurately than conventional solutions.

Figure 6:
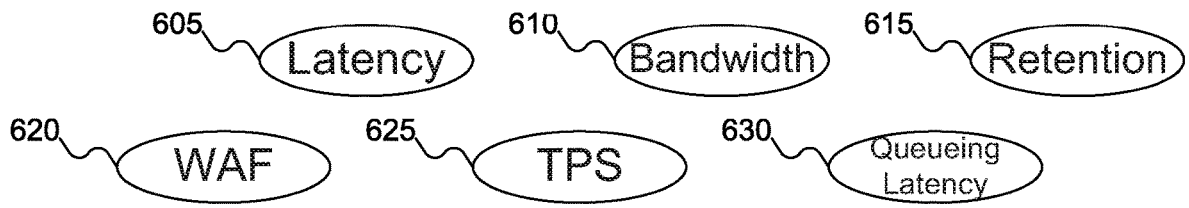
FIG. 6 shows various characteristics that may be measured within the SSD of FIG. 2.

FIG. 6 shows some of the various characteristics that may be measured within SSD 220 of FIG. 2. For example, these characteristics may include one or more of latency 605, bandwidth 610, retention 615, write amplification factor (WAF) 620, transactions per second (TPS) 625, and queuing latency 630. Latency 605 may represent the amount of time needed to complete a data request. As may be expected, the larger the data request, the longer SSD 220 of FIG. 2 will need to complete the request. Latency may also depend on the amount of time needed to translate a command, as described above with reference to FIG. 5, and/or on how worn down cells have become with time. Bandwidth 610 may represent the maximum amount of data SSD 220 of FIG. 2 may send or receive in a given unit of time. And retention 610 may represent how long data persists within SSD 220 of FIG. 2. WAF 620 may represent an amount of data a solid state storage controller has to write in relation to the amount of data that the host's flash controller has to write. TPS 625 may represent transactions received per a unit time, for example, a second. Queuing latency 630 may represent a time a job waits in a queue until it can be executed.

Figure 7A:
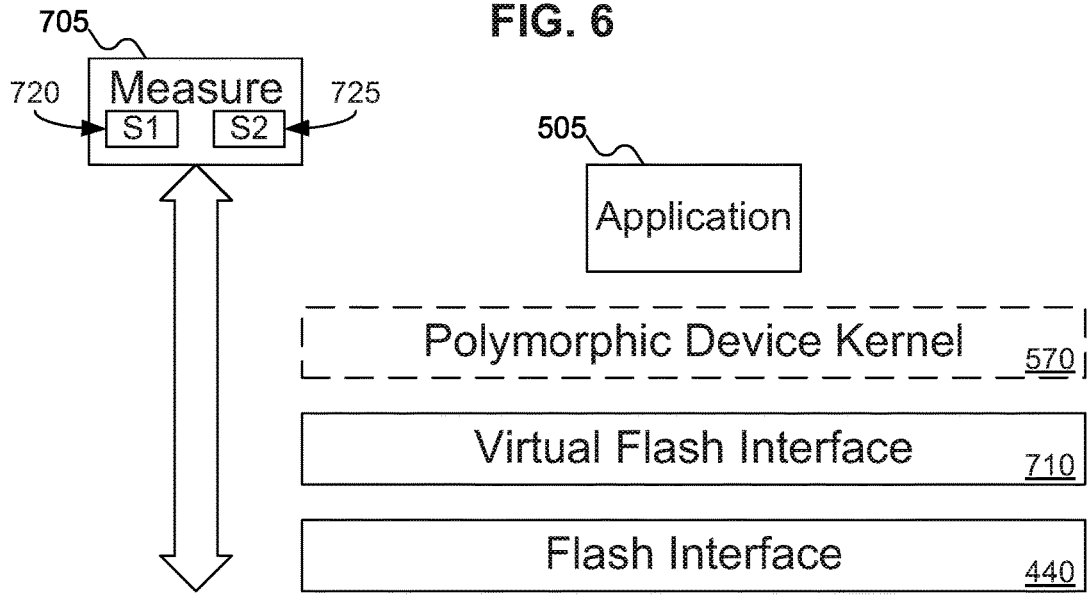
FIGS. 7A-7B show different ways of measuring the characteristics of FIG. 6, according to embodiments of the inventive concept.
Figure 7B:
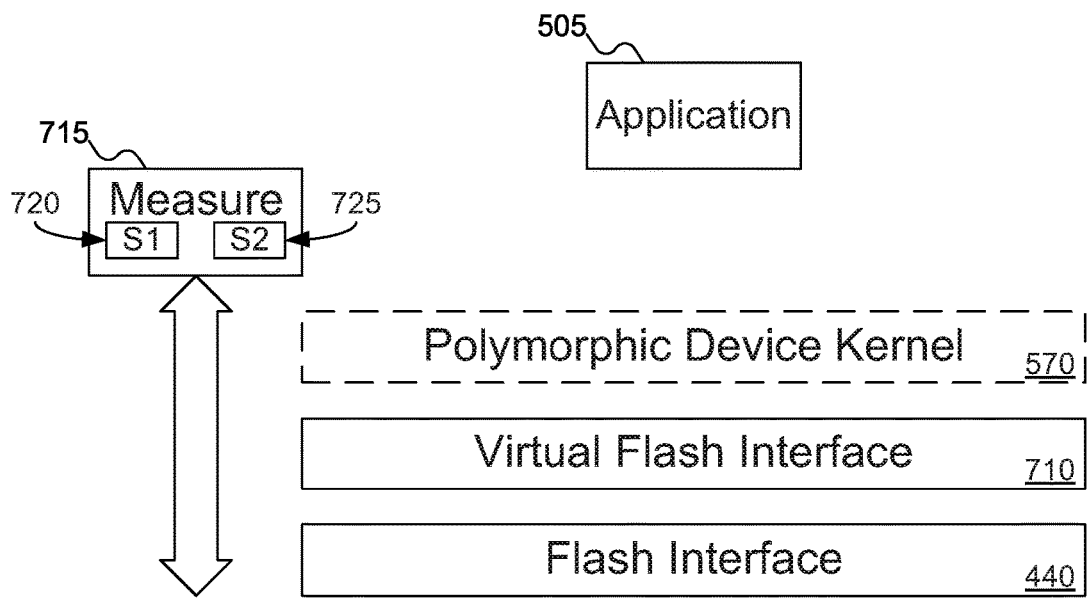

FIGS. 7A-7B show different ways of measuring characteristics 605, 610, and/or 615 of FIG. 6, according to embodiments of the inventive concept. In FIG. 7A, characteristics 605, 610, and/or 615 may be measured as measurement 705, measuring the characteristics due to polymorphic device kernel 570, virtual flash interface 710 (which manages the interface between the application and flash interface 440), and flash interface 440, as well as factoring in all of the consequences of application 505. For example, application 505 might use a virtual storage device within SSD 220 of FIG. 2 and manage the Flash Translation Layer internally. As such, in FIG. 7A, measurement 705 may include the application's internal FTL's consequences, which may include delays due to the Address Translation Layer, Garbage Collection, and Wear Leveling.

Alternatively, in FIG. 7B, measurement 715 may be taken without factoring in the consequences of the application. Measurement 715 factors in only polymorphic device kernel 570, virtual flash interface 710, and flash interface 440.

Both FIGS. 7A and 7B show measurements 705 and 715 including request sizes 720 and 725. Characteristics may be measured using different request sizes to fully determine the characteristic. For example, as described above, latency 605 of FIG. 6 often is a linear function of the request size. With two request sizes, latency 605 of FIG. 6 may be interpolated/extrapolated with acceptable accuracy for a range of request sizes. On the other hand, bandwidth 610 of FIG. 6 is usually not a linear function but more of a log-like curve. To generate a function that may approximate the relationship between bandwidth and request size may require significantly more than two data points, and therefore more than two request sizes 720 and 725 would be needed. Thus, one may see that the number of request sizes 720 and 725 used to measure a characteristic may vary, depending on the characteristic being measured. Request sizes 720 and 725 may be generated by in-storage monitoring engine 425 of FIG. 4, or they may be provided by host machine 110 of FIG. 1 when host machine 110 of FIG. 1 requests that the characteristic be measured.

Figure 8:
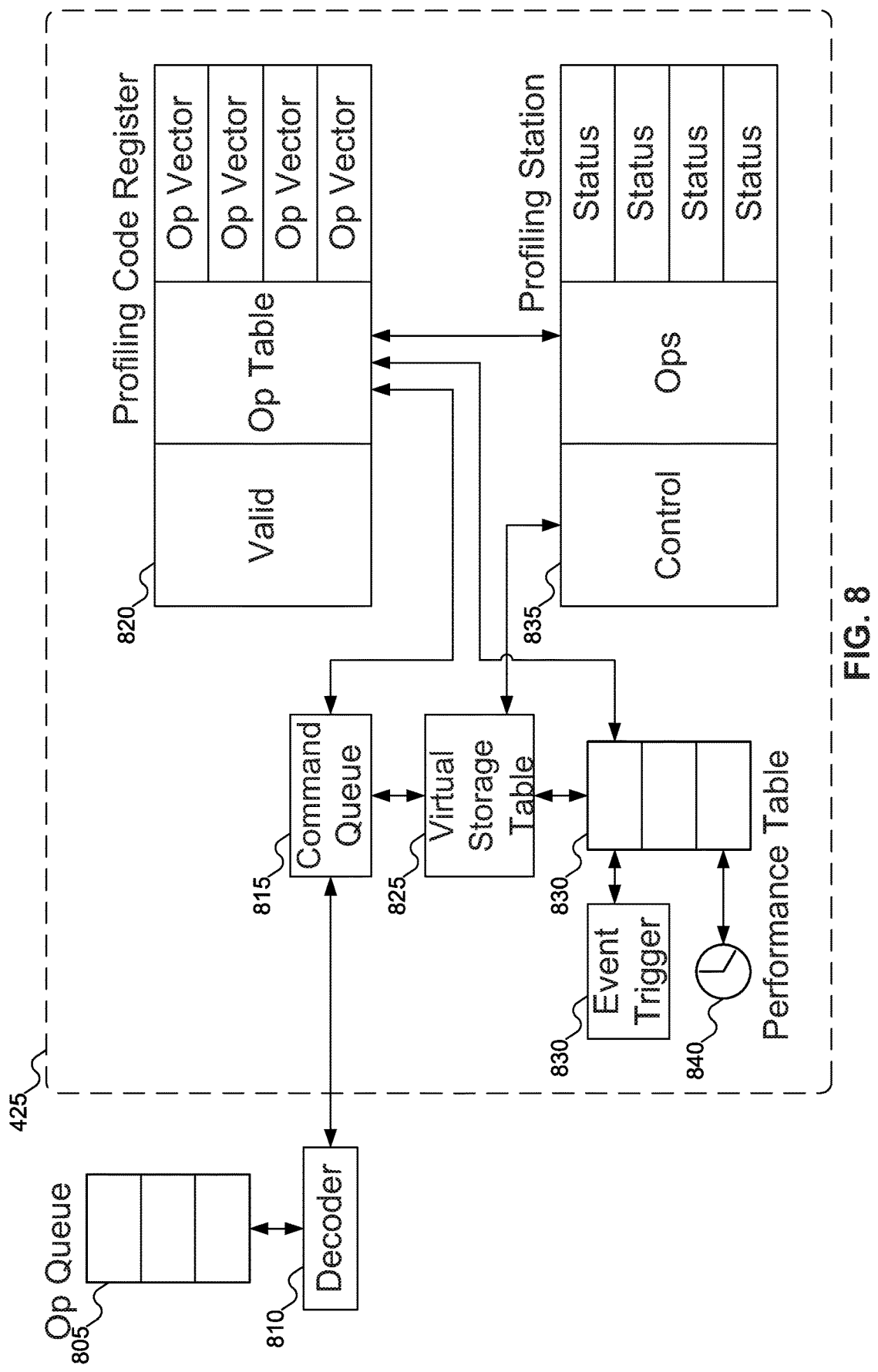
FIG. 8 shows an architecture for the in-storage monitoring engine of FIG. 4.

FIG. 8 shows an architecture for the in-storage monitoring engine of FIG. 4. In FIG. 8, op queue 805 may receive commands. These commands may include both profiling commands and other commands for SSD 220 of FIG. 2: for example, read and/or write commands. Decoder 810 may determine what command has been received. If the received command decodes to a profiling command, then the profiling command may be passed to command queue 815 within in-storage monitoring engine 425. Executing a profiling command may take a relatively lengthy amount of time: for example, from microseconds up to minutes. As a result, in-storage monitoring engine 425 may have multiple commands pending.

Given that in-storage monitoring engine 425 may perform only so many profiling commands at one time, it could happen that in-storage monitoring engine 425 is asked to perform more profiling commands than it may process in parallel. To address this problem, each profiling command may also have an associated priority, which may be specified by application 145 of FIG. 1 or host machine 110 of FIG. 5 when the profiling command is first presented. If in-storage monitoring engine 425 is asked to process more profiling commands than it may handle, in-storage monitoring engine 425 may determine the lowest priority profiling command and may reject it, informing the requestor that the profiling command could not be performed. Alternatively, rather than considering all profiling commands, in-storage monitoring engine 425 may organize the profiling commands based on their virtual storage devices, and may eliminate the lowest priority profiling command associated with the virtual storage device associated with the newly received profiling command.

Using information from the command in command queue 805, a vector may be accessed from profile code register 820. For example, the vector from profile code register may contain the particular codes needed to profile SSD 220 of FIG. 2 for latency 605 of FIG. 6. As described above, host machine 110 of FIG. 1 may specify request sizes 720 and 725 of FIGS. 7A-7B, or host machine 110 of FIG. 1 may let in-storage monitoring engine 425 determine request sizes 720 and 725 of FIGS. 7A-7B. If the command does not specify request sizes 720 and 725 of FIGS. 7A-7B, request sizes 720 and 725 of FIGS. 7A-7B may be determined from the vector in profile code register 820. The values for request sizes 720 and 725 of FIGS. 7A-7B may be self-generated, set in advance by the vendor, or user-configurable, depending on the embodiment of the inventive concept.

Virtual storage table 825 may store identifiers for various different virtual storage devices on SSD 220 of FIG. 2. Virtual storage table 825 stores information similar to that stored in SSD controller 410 of FIG. 4, and may either be a copy of that information or may share the information with SSD controller 410 of FIG. 4.

Performance table 830 may store information about past profiling commands for the virtual storage identifiers. If a profiling command is requested for a virtual storage device that has already been performed and the characteristics of SSD 220 of FIG. 2 have not changed significantly since that profiling command was performed, in-storage monitoring engine 425 may access the stored characteristics from performance table 830 and return that information to host machine 110 of FIG. 1.

If performance table 830 does not store the characteristics for the virtual storage device, either because the characteristics of SSD 220 of FIG. 2 have changed since the profile command was last performed or because SSD 220 of FIG. 2 has not been profiled before for the virtual storage device, then in-storage monitoring engine 425 may profile the virtual storage device using profiling station 835. Event trigger 840 and/or timer interrupt may be used to manage when to begin or end various profiling commands. The results of profiling station 835 may be stored in performance table 830 for future use.

Profiling station 835 may store profile commands that are pending to be performed on SSD 220 of FIG. 2. Applications and/or host machines may "take" slots in profiling station 835 until all slots are filled. Profiling station 835 may include ops, which may store the op codes to perform the profile command, and control, which may store information about whether and how to apply pre-emption control for various profile commands. For example, profiling bandwidth for SSD 220 of FIG. 2 may take a relatively long time as compared with profiling latency for SSD 220 of FIG. 2. Thus, a profile command to profile latency for SSD 220 of FIG. 2 may be executed with pre-emption control. Finally, the status fields may provide information about the status of a profile command. For example, status may use bit fields to indicate whether a profile command is active, paused, or completed. Status may also use bit fields to indicate parameters for the profile command, such as a priority for the profile command, its pre-emption status, and so on.

In addition, in-storage monitoring engine 425 may periodically repeat an earlier profiling command, to determine if the measured characteristics have changed. If the measured characteristics have changed, in-storage monitoring engine 425 may report the changes back to application 145 of FIG. 1 or host machine 110 that originally requested the profiling command.

Figure 9A:
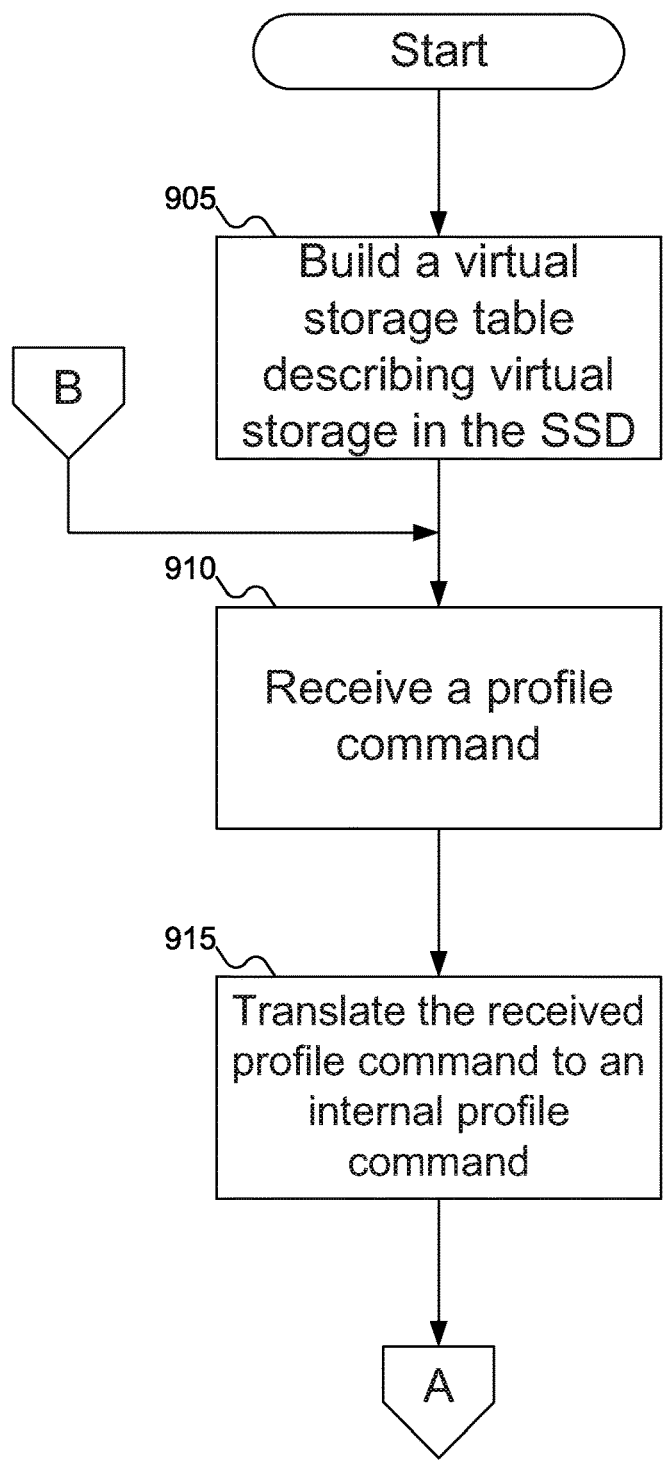
FIGS. 9A-9B show a flowchart of an example procedure for using the in-storage monitoring engine of FIG. 4 to determine characteristics of the SSD of FIGS. 4-5, according to an embodiment of the inventive concept.
Figure 9B:
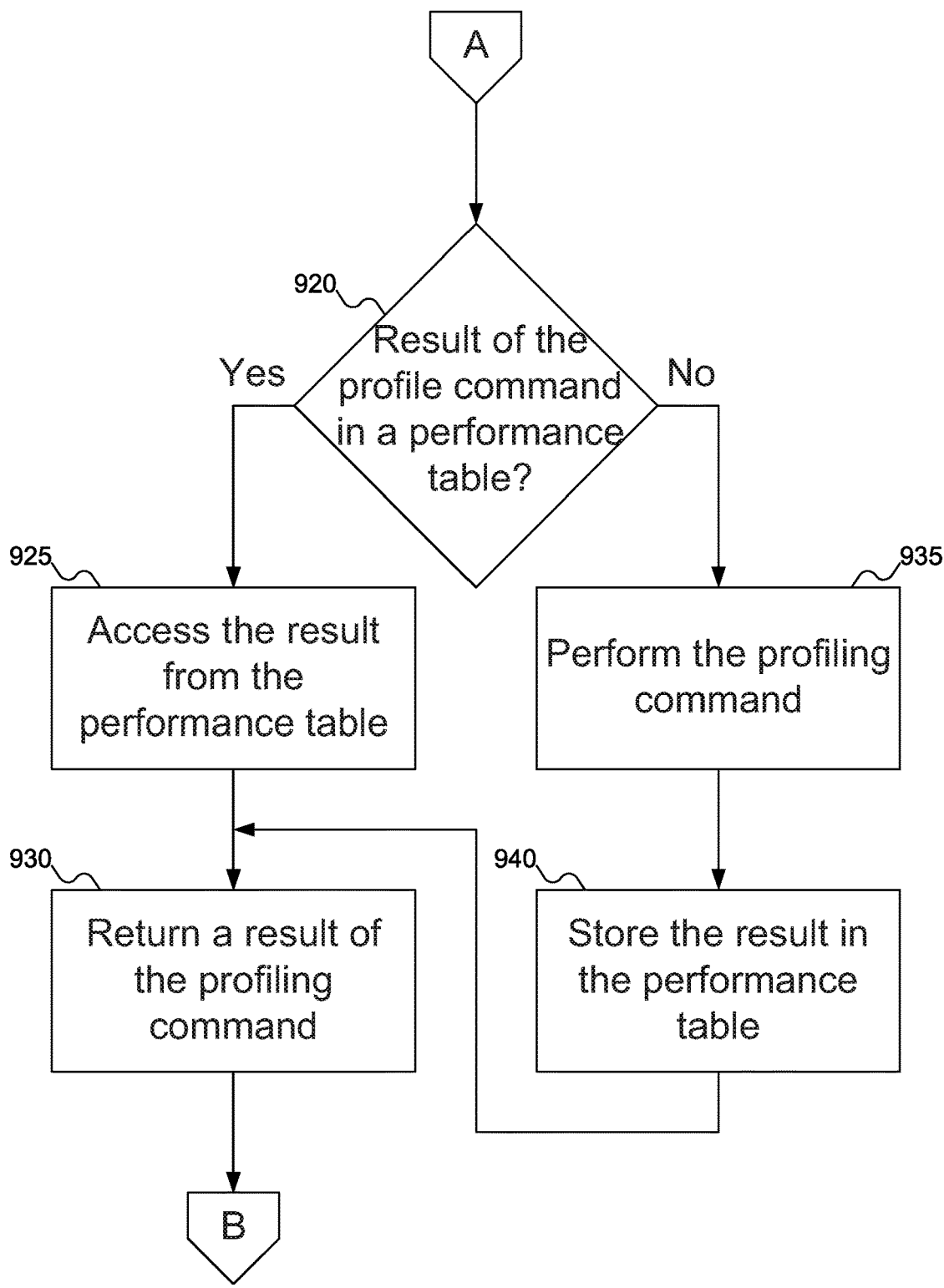

FIGS. 9A-9B show a flowchart of an example procedure for using in-storage monitoring engine 425 of FIG. 4 to determine characteristics 605, 610, and/or 615 of FIG. 6 of SSD 220 of FIGS. 4-5, according to an embodiment of the inventive concept. In FIG. 9A, at block 905, in-storage monitoring engine 425 of FIG. 4 may build virtual storage table 825 of FIG. 8 to reflect the available virtual storage devices within SSD 220 of FIG. 2. At block 910, SSD 220 of FIG. 2 may receive a profiling command, either from application 145 of FIG. 1 or from host machine 110 of FIG. 1. This profiling command may specify what characteristic 605, 610, and/or 615 of FIG. 6 is to be measured, and may specify what type of command is to be used. For example, application 145 of FIG. 1 or host machine 110 of FIG. 1 might only be interested in latency 605 of FIG. 6 or bandwidth 610 of FIG. 6 with respect to data writes, or with respect to data reads. Or the profiling command might specify to measure the characteristic of SSD 220 of FIG. 2 when performing Garbage Collection or Wear Levelling. Effectively, any command that SSD 220 of FIG. 2 may execute could be measured. Finally, the profiling command may specify any request sizes to use in profiling SSD 220 of FIG. 2. As described above, the profile command does not have to specify any request sizes, in which case in-storage monitoring engine 425 of FIG. 4 may determine what request sizes to use to profile SSD 220 of FIG. 2.

At block 915, after SSD 220 of FIG. 2 has received the profiling command, SSD 220 of FIG. 2 may decode the profiling command, translating it into an internal profiling command that may be processed by in-storage monitoring engine 425 of FIG. 4. This translation may be implemented for two reasons. First, the received profiling command might be formatted differently than how SSD 220 of FIG. 2 (and in-storage monitoring engine 425 of FIG. 4) expect a profiling command to appear. Second, different interfaces for different virtual storage devices might offer up commands to request profiling that use different formats from each other (and possibly from the internal format for a profiling command). As a result, translating the received profiling command into a profiling command may present in-storage monitoring engine 425 of FIG. 4 with a profiling command in an expected format. Block 915 may also encompass adding any additional data necessary to complete the profiling command. For example, if application 145 of FIG. 1 or host machine 110 of FIG. 1 do not specify request sizes 720 and 725 of FIGS. 7A-7B, block sizes may be accessed from profiling code register and added to the profiling command.

At block 920 (FIG. 9B), in-storage monitoring engine 425 of FIG. 4 may check to see if a result of the profiling command may be found in performance table 830 of FIG. 8. If so, then at block 925 in-storage monitoring engine 425 of FIG. 4 may access the result from performance table 830 of FIG. 8, and at block 930 in-storage monitoring engine 425 of FIG. 4 may return the result of the profiling command to the requestor.

On the other hand, if performance table 830 of FIG. 8 does not store a result of the profiling command, or if the result of the profiling command is out-of-date, at block 935 in-storage monitoring engine 425 of FIG. 4 may perform the profiling command. Then, at block 940 in-storage monitoring engine 425 of FIG. 4 may store the result in performance table 830 of FIG. 8, and at block 930 in-storage monitoring engine 425 of FIG. 4 may return the result of the profiling command to the requestor.

While FIGS. 9A-9B suggest that virtual storage table 825 of FIG. 8 is only built once, embodiments of the inventive concept may include changing virtual storage table 825 of FIG. 8 as needed. For example, during operation a new virtual storage device might be added to SSD 220 of FIG. 2. Accordingly, virtual storage table 825 of FIG. 8 may be updated when the new virtual storage device is added.

Figure 10:
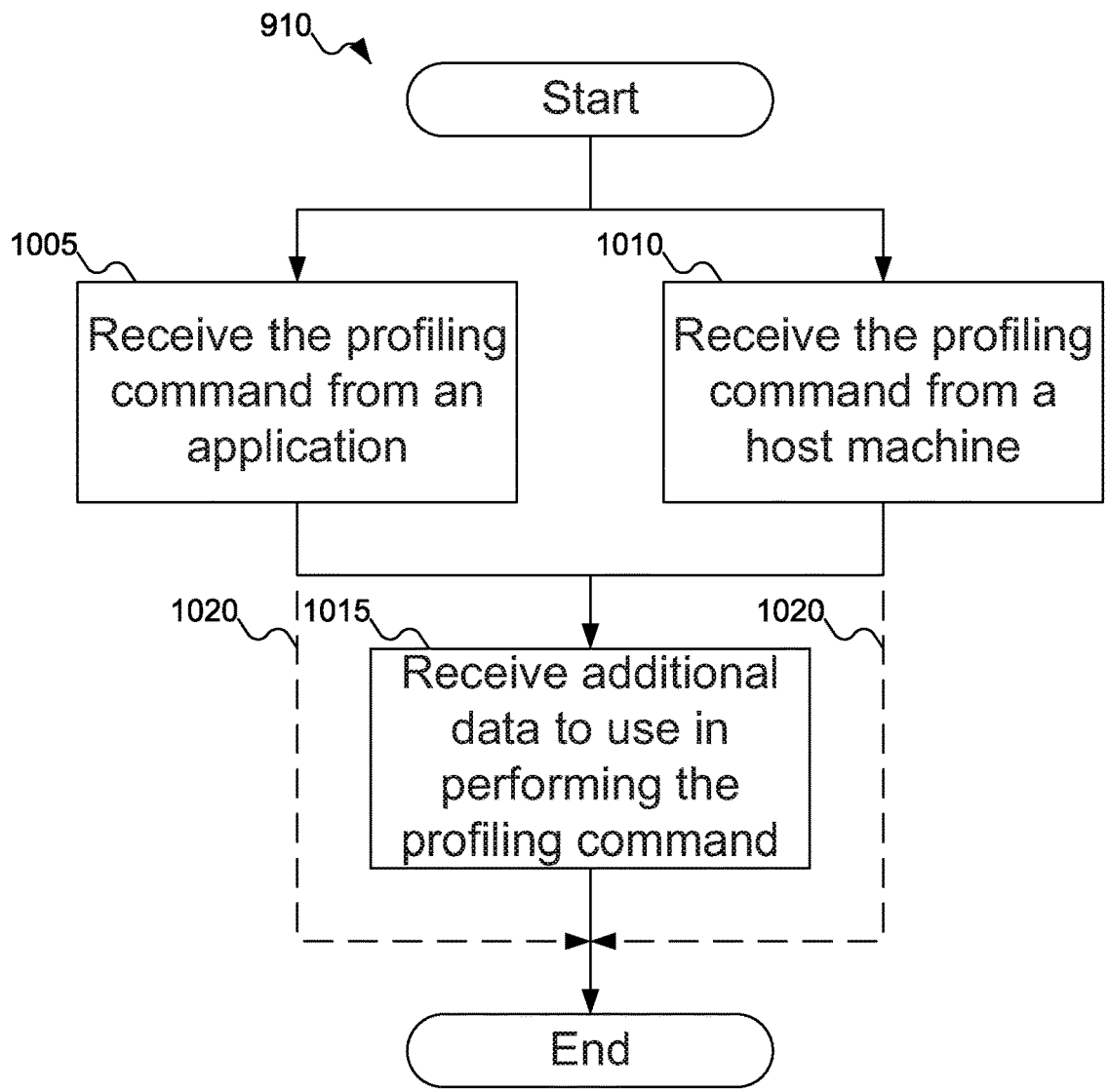
FIG. 10 shows a flowchart of an example procedure for receiving a profiling command and optional data to use in performing the profiling command using the in-storage monitoring engine of FIG. 4, according to an embodiment of the inventive concept.

FIG. 10 shows a flowchart of an example procedure for receiving a profiling command and optional data to use in performing the profiling command using in-storage monitoring engine 425 of FIG. 4, according to an embodiment of the inventive concept. In FIG. 10, at block 1005, in-storage monitoring engine 425 of FIG. 4 may receive the profiling command from application 145 of FIG. 1. Alternatively, at block 1010, in-storage monitoring engine 425 of FIG. 4 may receive the profiling command from host machine 110 of FIG. 1. Either way, at block 1015, in-storage monitoring engine 425 of FIG. 4 may receive additional data to use in performing the profiling command, such as request sizes 720 and 725 of FIGS. 7A-7B, or the priority for the profiling command. Block 1015 may be omitted, as shown by dashed lines 1020.

Figure 11:
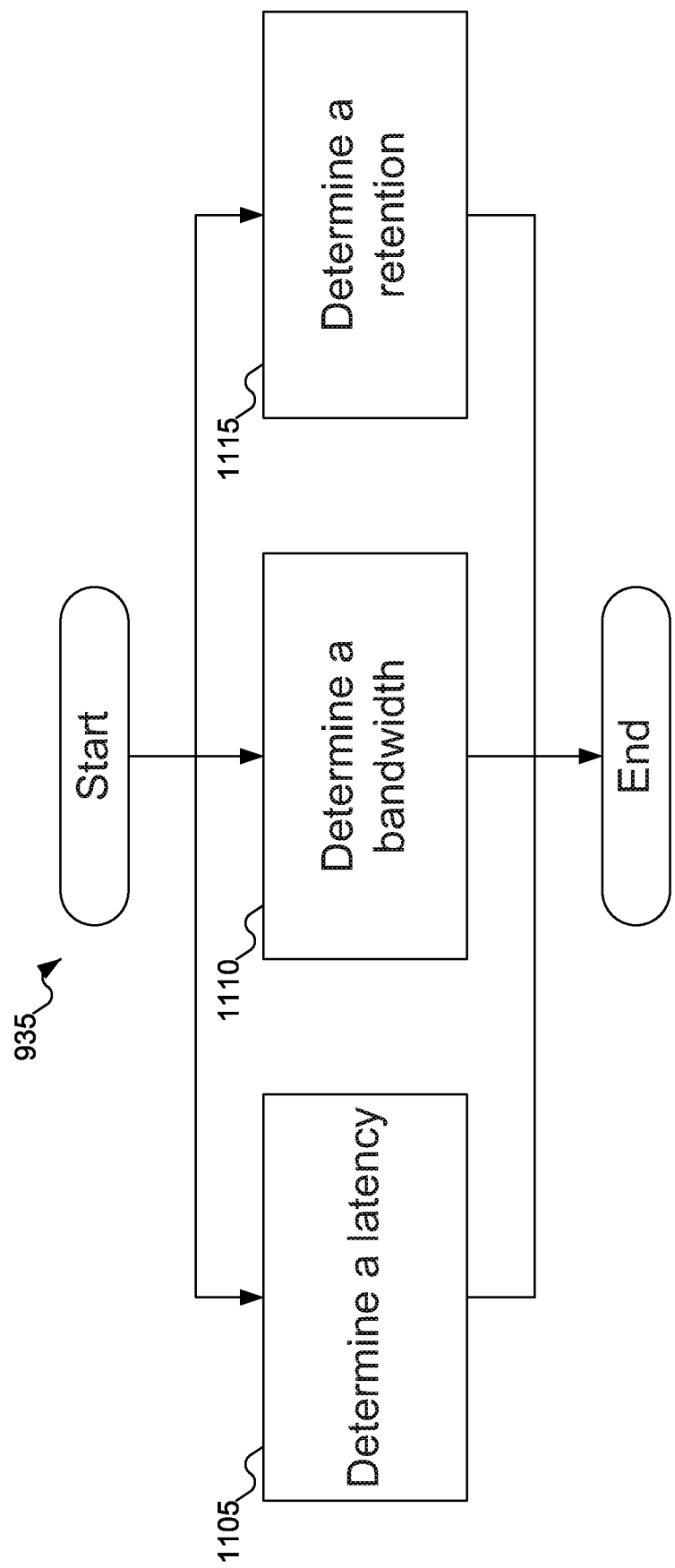
FIG. 11 shows a flowchart of an example procedure for determining different characteristics of the SSD of FIG. 2.

FIG. 11 shows a flowchart of an example procedure for determining different characteristics 605, 610, and/or 615 of FIG. 6 of SSD 220 of FIG. 2. In FIG. 11, at block 1105, in-storage monitoring engine 425 of FIG. 4 may determine latency 605 of FIG. 6 for SSD 220 of FIG. 2. Alternatively, at block 1110, in-storage monitoring engine 425 of FIG. 4 may determine bandwidth 610 of FIG. 6 for SSD 220 of FIG. 2. Finally, at block 1115, in-storage monitoring engine 425 of FIG. 4 may determine retention 615 of FIG. 6 for SSD 220 of FIG. 2.

In FIGS. 9A-11, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Figure 12:
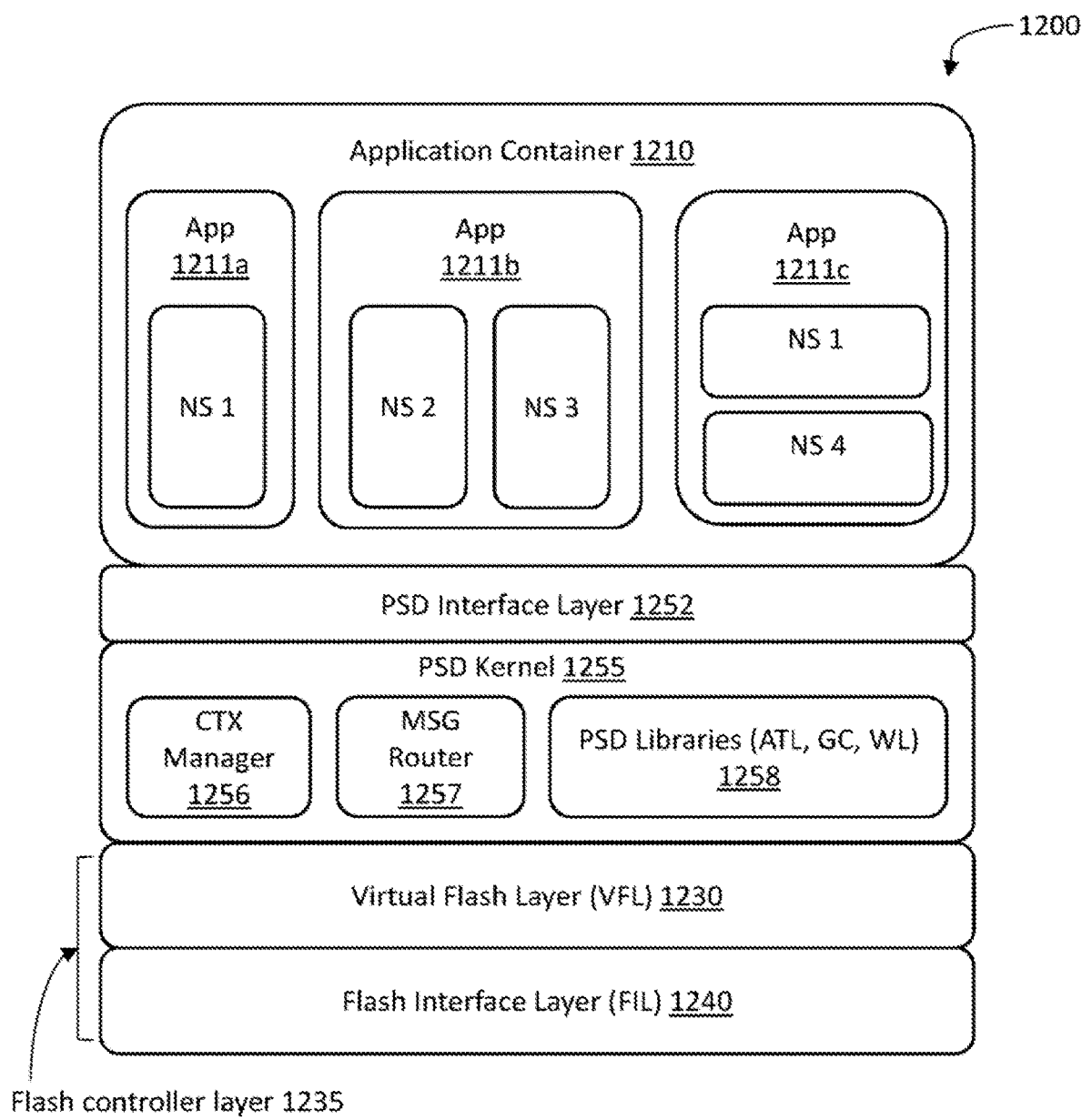
FIG. 12 shows a firmware stack of an example polymorphic SSD, according to an embodiment of the inventive concept.

FIG. 12 shows a firmware stack of an example polymorphic SSD, according to an embodiment of the inventive concept. Herein, the polymorphic SSD may be referred to as a polymorphic storage device (PSD).

The PSD firmware stack 1200 includes a flash controller layer 1235, a PSD kernel 1255, a PSD interface layer 1252, and an application container 1210. The application container 1210 can include one or more applications 1211a, 1211b, and 1211c. In the present example, the application 1211c refers to a current tenant that is running on the PSD to differentiate itself from other applications 1211a and 1211b. Hereinafter, the applications 1211a, 1211b, and 1211c may be collectively referred to as application 1211.

A firmware of the present polymorphic storage device defining behaviors of the storage device can be reconfigured via a firmware update. Through the firmware update, the present polymorphic storage device can be transformed into a different type of devices from the original configuration. For example, the present polymorphic storage is originally configured as a general-purpose storage device. By a firmware update, it can be converted into a special-purpose device, such as an in-storage computing device, a near-storage computing device, a key-value store device, a Hadoop distributed file system (HDFS) device, an object-store device, and a smart solid-state drive (SSD) having an intelligent computing capability. Applications running on such a special-purpose device or a smart SSD may have various application-specific features including, but not limited to, tagging features (e.g., image tagging), compression features (e.g., snappy, gzip, RLE), database features (e.g., space compaction, predicate evaluation), pattern matching features (e.g., string matching, virus scan, regular expression), machine learning features (e.g., training and inference), and conversion features (e.g., video transcoding, image sampling, document format conversion (e.g., PDF to postscript)).

The flash controller layer 1235 includes a virtual flash layer (VFL) 1230 and a flash interface layer (FIL) 1240. The flash controller layer 1235 can provide a hardware support to provide increased efficiency for the PSD. Depending on the application 1211 running on the PSD, the flash controller layer 1235 can optimize the use of the reconfigurable and extendable hardware to provide an efficient interface to the flash memory. The flash controller layer 1235 may be updated by a firmware update to support features of the applications 1211.

Packets (e.g., data, messages, and commands) received from a host computer are first sent to the PSD kernel 1255. The context (CTX) manager 1256 and the message router 1257 of the PSD kernel 1255 are responsible for routing packets received from the host computer. The CTX manager 1256 is aware of current tenant application(s) on the PSD along with its characteristics. The CTX manager 1256 can include a table of application IDs for tracking both currently running and other existing applications and the configurations. The CTX manager 1256 is also responsible for controlling the execution and liveness (i.e., context control) of the current tenant application(s) such as start/stop, resume, and suspend, etc. The PSD kernel 1255 can de-encapsulate the routed packets and process the routed packets accordingly. For example, if a command to "create" an application 1211 is received, the CTX manager 1256 can create an application context for the application 1211 with the host-provided data. The host-provided data may include configuration profiles or logics as well as a binary code of the application 1211 that is executable on the PSD as well as meta-data including a PSD library to allow the application 1211 to communicate with the PSD kernel 1255.

If a message received from the host computer relates to a registered application 1211 on the PSD, the PSD kernel 1255 can route the message and the corresponding data and/or commands to the registered application 1211 if the context of the registered application 1211 is active. If the context of the registered application 1211 is not active, the PSD kernel 1255 returns an error message to the host computer. The PSD kernel 1255 can send other error messages to the host computer if unregistered or unrecognized messages are received from the host computer.

The CTX manager 1256 is responsible for controlling the application container 1210. The CTX manager 1256 can create an application context for applications 1211, and distribute and manage the hardware resources of the PSD. The CTX manager 1256 can be implemented in a fully virtualized manner, similar to a virtual machine (VM), or in a para-virtualized manner. In one embodiment, the application 1211 can run as a normal firmware on a generic storage device without implementing the PSD kernel 1255. In another embodiment, the application 1211 can run as a new application specifically designed for the PSD with awareness of features provided by the PSD.

Some of applications 1211 may need application-specific wear leveling (WL) and/or garbage collection (GC) logics. These logics can be critical for the performance of the PSD. The PSD kernel 1255 provides PSD libraries 1258 including application-specific WL/GC interfaces and generic APIs to interface with the PSD kernel 1255. In the latter case, the application 1211 can register those libraries provided instead of implementing their own WL/GC logics. In the former case, the PSD kernel 1255 does not do anything related to WL/GC by providing full privileges to the application 1211 in the layer(s) of the PSD firmware stack 1200.

The applications 1211 can communicate with the underlying PSD kernel 1255 via the PSD interface layer 1252. The PSD interface layer 1252 can provide communication APIs and packets (e.g., messages, commands, and data) that pass through the PSD interface layer 1252 to the PSD.

The application 1211 can co-exist on a single PSD in the form of application context(s). The application container 1210 can hold application contexts for the applications 1211 that may be active or idle. The application 1211 can include application logics, a host protocol and a message processor layer, an application-specific address translation logic (ATL), a wear leveling (WL) logic, a garbage collection (GC) logic, etc. In some embodiments, the WL and GC logics are optional. For example, a key-value store application can have their key-value structure and algorithm for the core logics. The host protocol and message processor layer 1213 can be as simple as a wrapper of functions of core logics. In the case of key-value store application, the application-specific ATL 1214 can be merged into an integrated FTL.

Although no additional logics are mandatorily required from a hardware perspective on a modem SSD, the following factors can accelerate executions of a PSD. Examples of factors that can accelerate executions of a PSD include, but are not limited to, multiple translation lookaside buffers (TLBs) or a larger TLB, caches with an application container ID, a memory with more banks to reduce conflicts and/or more registers per dual inline memory modules (DIMMs), more flexible support for direct memory access (DMA), and a higher number of outstanding DMAs, a support for virtualization from embedded processors, an application context-aware flash controller, a fine-grain power control with awareness of polymorphism, a hardware-assisted message routing, etc. In another example, the PSD can include a field-programmable gate array (FPGA) to provide an accelerated application-specific functionality. Applications such as a machine-learning kernel, scientific computing in big data processing such as neural network, matrix manipulation, a fast Fourier transform (FFT), pattern matching, etc. can be accelerated with the FPGA rather than running codes on the CPUs of a general-purpose device. For applications such a machine-learning kernel, a tensor accelerator such as Tensor Processor Unit (TPU) can be used to accelerate matrix multiplication operations. For better space utilization and security, special hardware such as compressors and cryptographic engines can be used as well.

The applications 1211 running on the PSD can support various namespaces. In the present example, the application 1211a supports a namespace NS1, the application 1211b supports namespaces NS2 and NS 3, and the application 1211d supports namespaces NS 1 and NS 4. An application 1211 can run in multiple namespaces, while certain namespaces may be shared between multiple applications 1211.

According to one embodiment, the PSD kernel 1255 can receive a host command associated with a particular namespace over the PSD interface. A namespace is a unit of logical management and provides an isolation of an interface, an address space, a data format, performance, and security from other namespaces. A namespace can be created statistically or dynamically based on the PSD's capability. The PSD kernel 1255 can configure memory blocks of the nonvolatile memory of the PSD to associate them to a namespace and manage the mapping information between the namespace and the assigned memory blocks.

If no namespace is specified, operations are treated as a global namespace of the device to the PSD. A namespace can be associated with more than one applications running in the application container, and an application can be associated with more than one namespaces. In the present example, multiple applications 1211 (e.g., NoSQL applications) run in the same namespace. In the meantime, an application 1211 can work with two or more namespaces. In the case of NoSQL applications, one namespace may be assigned for a block interface and another namespace may be assigned for a key-value interface. In this case, metadata may be stored in the key-value namespace, and data may be stored in the block namespace.

According to one embodiment, a storage device includes an application container containing one or more applications, wherein each of the one or more applications runs in one or more namespaces; a polymorphic storage device (PSD) kernel implemented within the storage device and configured to provide a host-side interface to a host computer and receive a plurality of packets including data, messages, and commands from the host computer via the host-side interface, and route the plurality of packets to an application in the application container based on a namespace associated with the plurality of packets; and a non-volatile memory. The PSD kernel is further configured to provide a key-value interface and a block interface to the non-volatile memory based on the namespace associated with the plurality of packets. The non-volatile memory stores a plurality of block data that is accessible via the block interface, and stores a plurality of key-value data that is accessible via the key-value interface.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device, comprising:

storage memory to store data;

a host interface to manage communications between the storage device and a host machine;

a translation layer to translate a first address received from a host into a second address in the storage memory;

a storage interface to access the data from the second address in the storage memory; and an in-storage monitoring engine to determine a characteristic of the storage device, the characteristic drawn from a set including a latency, a bandwidth, and a retention of the storage device.

Statement 2. An embodiment of the inventive concept includes a storage device according to statement 1, wherein:

the storage device includes a Solid State Drive (SSD);

the storage memory includes a flash memory to store the data;

the translation layer includes a Flash Translation Layer (FTL) to translate the first address received from the host into the second address in the flash memory;

the storage interface includes a flash interface to access the data from the second address in the flash memory.

Statement 3. An embodiment of the inventive concept includes a storage device according to statement 1, further comprising a storage device controller including the host interface, the storage interface, and the in-storage monitoring engine.

Statement 4. An embodiment of the inventive concept includes a storage device according to statement 1, further comprising a polymorphic device kernel including the in-storage monitoring engine.

Statement 5. An embodiment of the inventive concept includes a storage device according to statement 1, wherein the in-storage monitoring engine is operative to measure the characteristic of the storage device without the characteristic being influenced by the translation layer.

Statement 6. An embodiment of the inventive concept includes a storage device according to statement 1, wherein the in-storage monitoring engine is operative to measure the characteristic of the storage device including the characteristic being influenced by the translation layer.

Statement 7. An embodiment of the inventive concept includes a storage device according to statement 6, wherein the translation layer is specific to an application on the host machine.

Statement 8. An embodiment of the inventive concept includes a storage device according to statement 1, wherein the in-storage monitoring engine may measure the characteristic of the storage device for a specific type of profiling command.

Statement 9. An embodiment of the inventive concept includes a storage device according to statement 8, wherein the specific type of profiling command is specified by an application on the host machine.

Statement 10. An embodiment of the inventive concept includes a storage device according to statement 1, wherein the in-storage monitoring engine is operative to measure the characteristic of the storage device using a specific set of request sizes.

Statement 11. An embodiment of the inventive concept includes a storage device according to statement 10, wherein the specific set of request sizes are specified by an application on the host machine.

Statement 12. An embodiment of the inventive concept includes a storage device according to statement 1, wherein the in-storage monitoring engine is operative to periodically measure the characteristic of the storage device.

Statement 13. An embodiment of the inventive concept includes a storage device according to statement 12, wherein the in-storage monitoring engine is operative to report changes in the characteristic of the storage device to the host machine.

Statement 14. An embodiment of the inventive concept includes a storage device according to statement 1, wherein the in-storage monitoring engine includes:

a virtual storage table to store information about a plurality of virtual storage devices within the storage device; and a profiling station to manage a plurality of profiling commands on at least one of the plurality of virtual storage devices within the storage device.

Statement 15. An embodiment of the inventive concept includes a storage device according to statement 14, wherein at least one of the plurality of profiling commands includes a specific type of profiling command to perform on the at least one of the plurality of virtual storage devices within the storage device.

Statement 16. An embodiment of the inventive concept includes a storage device according to statement 14, wherein at least one of the plurality of profiling commands includes at least one request size to be used in performing the profiling command.

Statement 17. An embodiment of the inventive concept includes a storage device according to statement 14, wherein the in-storage monitoring engine further includes a profile code register to store information about how to execute at least one of the plurality of profiling commands.

Statement 18. An embodiment of the inventive concept includes a storage device according to statement 17, wherein the profile code register is user-configurable.

Statement 19. An embodiment of the inventive concept includes a storage device according to statement 14, wherein the in-storage monitoring engine further includes a performance table to store information about previous profiling commands.

Statement 20. An embodiment of the inventive concept includes a storage device according to statement 19, wherein at least one of the plurality of profiling commands may be satisfied with information in the performance table.

Statement 21. An embodiment of the inventive concept includes a storage device according to statement 14, wherein at least one of the plurality of profiling commands may include a priority.

Statement 22. An embodiment of the inventive concept includes a method, comprising:

receiving a profiling command from a requestor at a storage device, the profiling command specifying a characteristic of the storage device to be determined;

performing the profiling command internally to the storage device to produce a result; and returning the result to the requestor from the storage device.

Statement 23. An embodiment of the inventive concept includes a method according to statement 22, wherein:

receiving a profiling command from a requestor at a storage device includes receiving the profiling command from a requestor at a Solid State Drive (SSD);

performing the profiling command internally to the storage device to produce a result includes performing the profiling command internally to the SSD to produce the result; and returning the result to the requestor from the SSD.

Statement 24. An embodiment of the inventive concept includes a method according to statement 22, wherein receiving a profiling command from a requestor at a storage device includes receiving the profiling command from an application at the storage device.

Statement 25. An embodiment of the inventive concept includes a method according to statement 22, wherein receiving a profiling command from a requestor at a storage device includes receiving the profiling command from a host machine at the storage device.

Statement 26. An embodiment of the inventive concept includes a method according to statement 22, wherein receiving a profiling command from a requestor at a storage device includes receiving the profiling command from the requestor at the storage device without receiving any request sizes from the requestor to use in performing the profiling command.

Statement 27. An embodiment of the inventive concept includes a method according to statement 22, wherein performing the profiling command internally to the storage device to produce a result includes performing the profiling command for a virtual storage device within the storage device to produce a result.

Statement 28. An embodiment of the inventive concept includes a method according to statement 22, wherein performing the profiling command internally to the storage device to produce a result includes one of determining a latency for the storage device as the result, determining a bandwidth of the storage device as the result, and determining a retention of the storage device as the result.

Statement 29. An embodiment of the inventive concept includes a method according to statement 28, wherein:

receiving a profiling command from a requestor at a storage device includes receiving the profiling command from the requestor at the storage device without receiving any request sizes from the requestor to use in executing the profiling command; and determining a latency for the storage device as the result includes determining the latency for the storage device as the result using internally generated request sizes.

Statement 30. An embodiment of the inventive concept includes a method according to statement 28, wherein:

receiving a profiling command from a requestor at a storage device includes receiving the profiling command and a plurality of request sizes from the requestor at the storage device; and determining a latency for the storage device as the result includes determining the latency for the storage device as the result using the request sizes.

Statement 31. An embodiment of the inventive concept includes a method according to statement 28, wherein:

receiving a profiling command from a requestor at a storage device includes receiving the profiling command from the requestor at the storage device without receiving any request sizes from the requestor to use in executing the profiling command; and determining a bandwidth for the storage device as the result includes determining the bandwidth for the storage device as the result using internally generated request sizes.

Statement 32. An embodiment of the inventive concept includes a method according to statement 28, wherein:

receiving a profiling command from a requestor at a storage device includes receiving the profiling command and a plurality of request sizes from the requestor at the storage device; and determining a bandwidth for the storage device as the result includes determining the bandwidth for the storage device as the result using the request sizes.

Statement 33. An embodiment of the inventive concept includes a method according to statement 22, wherein performing the profiling command internally to the storage device to produce a result includes storing the result in a performance table.

Statement 34. An embodiment of the inventive concept includes a method according to statement 22, further comprising:

receiving a second profiling command from a second requestor at the storage device;

examining the performance table to see if the result in the performance table satisfies the second profiling command; and if the result satisfies the second profiling command, returning the result in the performance table to the requestor from the storage device.

Statement 35. An embodiment of the inventive concept includes a method according to statement 22, further comprising building a virtual storage table storing information about at least one virtual storage device within the storage device.

Statement 36. An embodiment of the inventive concept includes a method according to statement 22, wherein performing the profiling command internally to the storage device to produce a result includes:

translating the profiling command received from the requestor into an internal profiling command; and performing the internal profiling command to produce the result.

Statement 37. An embodiment of the inventive concept includes a method according to statement 22, wherein performing the profiling command internally to the storage device to produce a result includes performing the profiling command internally to the storage device to measure the characteristic of the storage device without the characteristic being influenced by a translation layer.

Statement 38. An embodiment of the inventive concept includes a method according to statement 22, wherein performing the profiling command internally to the storage device to produce a result includes performing the profiling command internally to the storage device to measure the characteristic of the storage device including the characteristic being influenced by translation layer.

Statement 39. An embodiment of the inventive concept includes an article, comprising a tangible storage medium, the tangible storage medium having stored thereon non-transitory instructions that, when executed by a machine, result in:

receiving a profiling command from a requestor at a storage device, the profiling command specifying a characteristic of the storage device to be determined;

performing the profiling command internally to the storage device to produce a result; and returning the result to the requestor from the storage device.

Statement 40. An embodiment of the inventive concept includes an article according to statement 39, wherein:

receiving a profiling command from a requestor at a storage device includes receiving the profiling command from a requestor at a Solid State Drive (SSD);

performing the profiling command internally to the storage device to produce a result includes performing the profiling command internally to the SSD to produce the result; and returning the result to the requestor from the storage device includes returning the result to the requestor from the SSD.

Statement 41. An embodiment of the inventive concept includes an article according to statement 39, wherein receiving a profiling command from a requestor at a storage device includes receiving the profiling command from an application at the storage device.

Statement 42. An embodiment of the inventive concept includes an article according to statement 39, wherein receiving a profiling command from a requestor at a storage device includes receiving the profiling command from a host machine at the storage device.

Statement 43. An embodiment of the inventive concept includes an article according to statement 39, wherein receiving a profiling command from a requestor at a storage device includes receiving the profiling command from the requestor at the storage device without receiving any request sizes from the requestor to use in performing the profiling command.

Statement 44. An embodiment of the inventive concept includes an article according to statement 39, wherein performing the profiling command internally to the storage device to produce a result includes performing the profiling command for a virtual storage device within the storage device to produce a result.

Statement 45. An embodiment of the inventive concept includes an article according to statement 39, wherein performing the profiling command internally to the storage device to produce a result includes one of determining a latency for the storage device as the result, determining a bandwidth of the storage device as the result, and determining a retention of the storage device as the result.

Statement 46. An embodiment of the inventive concept includes an article according to statement 45, wherein:

receiving a profiling command from a requestor at a storage device includes receiving the profiling command from the requestor at the storage device without receiving any request sizes from the requestor to use in executing the profiling command; and determining a latency for the storage device as the result includes determining the latency for the storage device as the result using internally generated request sizes.

Statement 47. An embodiment of the inventive concept includes an article according to statement 45, wherein:

receiving a profiling command from a requestor at a storage device includes receiving the profiling command and a plurality of request sizes from the requestor at the storage device; and determining a latency for the storage device as the result includes determining the latency for the storage device as the result using the request sizes.

Statement 48. An embodiment of the inventive concept includes an article according to statement 45, wherein:

receiving a profiling command from a requestor at a storage device includes receiving the profiling command from the requestor at the storage device without receiving any request sizes from the requestor to use in executing the profiling command; and determining a bandwidth for the storage device as the result includes determining the bandwidth for the storage device as the result using internally generated request sizes.

Statement 49. An embodiment of the inventive concept includes an article according to statement 45, wherein:

receiving a profiling command from a requestor at a storage device includes receiving the profiling command and a plurality of request sizes from the requestor at the storage device; and determining a bandwidth for the storage device as the result includes determining the bandwidth for the storage device as the result using the request sizes.

Statement 50. An embodiment of the inventive concept includes an article according to statement 39, wherein performing the profiling command internally to the storage device to produce a result includes storing the result in a performance table.

Statement 51. An embodiment of the inventive concept includes an article according to statement 39, the tangible storage medium having stored thereon further non-transitory instructions that, when executed by the machine, result in:

receiving a second profiling command from a second requestor at the storage device;

examining the performance table to see if the result in the performance table satisfies the second profiling command; and if the result satisfies the second profiling command, returning the result in the performance table to the requestor from the storage device.

Statement 52. An embodiment of the inventive concept includes an article according to statement 39, the tangible storage medium having stored thereon further non-transitory instructions that, when executed by the machine, result in building a virtual storage table storing information about at least one virtual storage device within the storage device.

Statement 53. An embodiment of the inventive concept includes an article according to statement 39, wherein performing the profiling command internally to the storage device to produce a result includes:

translating the profiling command received from the requestor into an internal profiling command; and performing the internal profiling command to produce the result.

Statement 54. An embodiment of the inventive concept includes an article according to statement 39, wherein performing the profiling command internally to the storage device to produce a result includes performing the profiling command internally to the storage device to measure the characteristic of the storage device without the characteristic being influenced by a translation layer.

Statement 55. An embodiment of the inventive concept includes an article according to statement 39, wherein performing the profiling command internally to the storage device to produce a result includes performing the profiling command internally to the storage device to measure the characteristic of the storage device including the characteristic being influenced by a translation layer.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A method for controlling performance characteristics associated with a system, the method comprising:
   receiving a command associated at least in part with a portion of the system;
   determining that the system operates with a first performance characteristic;
   performing an operation associated with the command via a queue stored in memory of the system;
   generating data in a table based on a second performance characteristic associated with addresses of at least one storage device of the system;
   receiving first information from the storage device and identifying the data from the table based on the first information;
   causing the system to operate with a third performance characteristic different from the first performance characteristic based at least in part on the data; and
   transmitting second information to a first device based on the third performance characteristic,
   wherein the table is arranged according to a first format, the first format associated with a first protocol.

2. The method according to claim 1, wherein the second performance characteristic is based on the storage device.

3. The method according to claim 2, wherein the data includes a status information.

4. The method according to claim 2, wherein the data includes information associated with a condition affecting the first performance characteristic or the second performance characteristic.

5. The method according to claim 1, wherein the table is based at least in part on one or more data blocks.

6. The method according to claim 1, wherein the table is associated with a trigger.

7. The method according to claim 1 wherein the table is associated with error information.

8. The method according to claim 1, further comprising receiving the data at the first device.

9. The method according to claim 1, further comprising performing an action based on the first information.

10. The method according to claim 1, further comprising transmitting information associated with at least one of the first performance characteristic, the second performance characteristic, or the third performance characteristic.

11. The method according to claim 1, further comprising receiving a fourth performance characteristic.

12. The method according to claim 11, further comprising operating the storage device based on the fourth performance characteristic.

13. The method according to claim 1, wherein the storage device comprises a Solid State Drive (SSD).

14. The method according to claim 1, wherein the system comprises a computer.

15. The method according to claim 1, wherein the system comprises a server.

16. A storage system for controlling performance characteristics associated with a system, wherein the storage system stores computer-executable instructions which, when executed by a processor, cause the processor to perform operations comprising:
  receiving a command associated at least in part with a portion of the system;
  determining that the system operates with a first performance characteristic;
  performing an operation associated with the command via a queue stored in memory of the system;
  generating data in a table based on a second performance characteristic associated with addresses of at least one storage device of the system;
  receiving first information from the storage device and identifying the data from the table based on the first information;
  causing the system to operate with a third performance characteristic different from the first performance characteristic based at least in part on the data; and
  transmitting second information to a first device based on the third performance characteristic,
  wherein the table is arranged according to a first format, the first format associated with a first protocol.

17. The storage system according to claim 16, wherein the storage device comprises a Solid State Drive (SSD).

18. A non-transitory computer-readable medium storing computer-executable instructions for managing memory which, when executed by a processor, cause the processor to perform operations comprising:
  receiving a command associated at least in part with a portion of a system;
  determining that the system operates with a first performance characteristic;
  performing an operation associated with the command via a queue stored in memory of the system;
  generating data in a table based on a second performance characteristic associated with addresses of at least one storage device of the system;
  receiving first information from the storage device and identifying the data from the table based on the first information;
  causing the system to operate with a third performance characteristic different from the first performance characteristic based at least in part on the data; and
  transmitting second information to a first device based on the third performance characteristic,
  wherein the table is arranged according to a first format, the first format associated with a first protocol.

19. The non-transitory computer-readable medium according to claim 18, wherein the storage device comprises a Solid State Drive (SSD).

20. The non-transitory computer-readable medium according to claim 18, wherein the system comprises a server.

* * * * *